United States Patent
Adams et al.

(10) Patent No.: US 11,942,802 B2
(45) Date of Patent: Mar. 26, 2024

(54) DEVICES, STRUCTURES, AND METHODS FOR WIRELESSLY POWERING EXTERNAL ACCESSORIES

(71) Applicant: Rivian IP Holdings, LLC, Plymouth, MI (US)

(72) Inventors: William Adams, Howell, MI (US); Steven Korsch, Jackson, MI (US)

(73) Assignee: Rivian IP Holdings, LLC, Irvine, CA (US)

( * ) Notice: Subject to any disclaimer, the term of this patent is extended or adjusted under 35 U.S.C. 154(b) by 208 days.

(21) Appl. No.: 17/531,078

(22) Filed: Nov. 19, 2021

(65) Prior Publication Data
US 2023/0163642 A1 May 25, 2023

(51) Int. Cl.
| | |
|---|---|
| H02J 50/90 | (2016.01) |
| B60L 50/60 | (2019.01) |
| B60L 55/00 | (2019.01) |
| H02J 7/00 | (2006.01) |
| H02J 50/10 | (2016.01) |

(52) U.S. Cl.
CPC .............. *H02J 50/90* (2016.02); *B60L 50/60* (2019.02); *B60L 55/00* (2019.02); *H02J 7/00032* (2020.01); *H02J 7/0063* (2013.01); *H02J 50/10* (2016.02)

(58) Field of Classification Search
CPC ........ H02J 50/90; H02J 50/10; H02J 7/00032; H02J 7/0063; B60L 55/00; B60L 50/60
USPC ....................................................... 307/10.1
See application file for complete search history.

(56) References Cited

U.S. PATENT DOCUMENTS

| | | | | |
|---|---|---|---|---|
| 9,379,780 | B2* | 6/2016 | Widmer | H02J 50/40 |
| 2011/0254377 | A1* | 10/2011 | Wildmer | H02J 50/10 |
| | | | | 307/104 |
| 2012/0153894 | A1* | 6/2012 | Widmer | H02J 50/10 |
| | | | | 320/108 |
| 2015/0022142 | A1* | 1/2015 | Garcia Briz | H02J 50/12 |
| | | | | 320/108 |
| 2015/0077046 | A1* | 3/2015 | Huang | B60L 53/38 |
| | | | | 320/108 |
| 2016/0272072 | A1* | 9/2016 | Huang | H02J 50/12 |
| 2017/0237292 | A1* | 8/2017 | Jeong | H02J 50/12 |
| | | | | 307/104 |

OTHER PUBLICATIONS

Belkin, "What is Magsafe & Why you want it in 2021", © 2021 Belkin International, Inc.; https://www.belkin.com/us/resource-center/what-is-magsafe/ pp. 1-11.

* cited by examiner

*Primary Examiner* — Alfonso Perez Borroto
(74) *Attorney, Agent, or Firm* — Foley & Lardner LLP

(57) ABSTRACT

Various disclosed embodiments include illustrative systems, structures, and methods. In an illustrative embodiment, a system includes a power transmitter operably couplable to a source of electrical power and configured to wirelessly transmit electrical power and a power receiver alignable with the power transmitter on an opposing side of a non-conductive panel of a structure. The power receiver is configured to generate electrical power responsive to the electrical power wirelessly transmitted by the power transmitter.

15 Claims, 5 Drawing Sheets

DEVICES, STRUCTURES, AND METHODS FOR WIRELESSLY POWERING EXTERNAL ACCESSORIES

INTRODUCTION

The present disclosure relates to powering devices. The statements in this section merely provide background information related to the present disclosure and may not constitute prior art.

Electrical devices that are used outside a structure may use stored electrical energy from electrical sources such as batteries. However, electrical sources such as batteries do not provide limitless power. Further, powering devices outside of the structure from an electrical power source disposed inside the structure might compromise integrity of the structure.

BRIEF SUMMARY

Various disclosed embodiments include illustrative systems, structures, and methods.

In an illustrative embodiment, a system for providing power externally from a structure of a vehicle. The system includes a power transmitter operably couplable to a source of electrical power and configured to wirelessly transmit electrical power. The power transmitter includes one or more alignment elements. A power receiver is alignable with the power transmitter via the one or more alignment elements on an opposing side of a non-conductive panel of the structure. The power receiver is configured to generate electrical power responsive to the electrical power wirelessly transmitted by the power transmitter.

In another illustrative embodiment, a structure includes a source of electrical power, a non-conductive panel configured to separate an interior of the structure from an exterior of the structure; and a system. The system includes a power transmitter operably couplable to the source of electrical power and configured to wirelessly transmit electrical power and a power receiver alignable with the power transmitter on an opposing side of the non-conductive panel. The power receiver is configured to generate electrical power responsive to the electrical power wirelessly transmitted by the power transmitter.

In another illustrative embodiment, a system includes a transmitter attachable to a non-conductive panel of a structure of a vehicle, a power source, a central gateway manager, and a power management module. The central gateway manager is configured to receive a request for electrical power and generate instructions to supply electrical power from the power source to the transmitter. The power management module is configured to instruct the power source to supply electrical power to the transmitter responsive to the generated instructions.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE DRAWINGS

Illustrative embodiments are illustrated in referenced figures of the drawings. It is intended that the embodiments and figures disclosed herein are to be considered illustrative rather than restrictive.

Like reference symbols in the various drawings generally indicate like elements.

DETAILED DESCRIPTION

Figure 1:
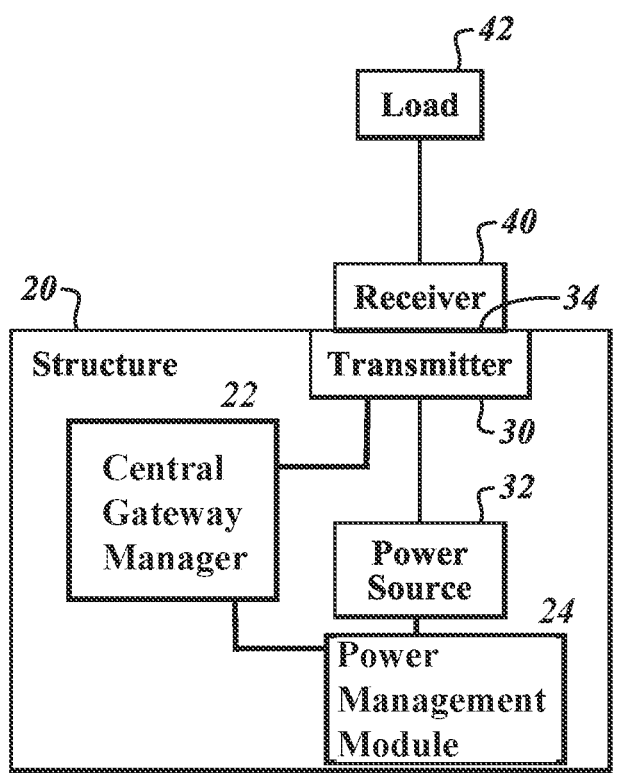
FIG. 1 is a block diagram of illustrative components used for wireless power transmission.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here.

Various disclosed embodiments include illustrative systems, structures, and methods. As will be explained below, such embodiments can provide power to devices external to a structure.

Given by way of non-limiting overview, in various embodiments a system is provided for wirelessly transmitting electrical power exterior a structure. In various embodiments a power transmitter is operably couplable to a source of electrical power and is configured to wirelessly transmit electrical power. A power receiver is alignable with the power transmitter on an opposing side of a non-conductive panel of a structure and is configured to generate electrical power responsive to the electrical power wirelessly transmitted by the power transmitter.

Now that a non-limiting overview has been provided, illustrative details of non-limiting embodiments will be explained by way of non-limiting examples provided by way of illustration only and not of limitation.

Referring to FIG. 1, in various embodiments an illustrative structure 20 may be configured in a wireless power transmission configuration. In various embodiments the structure 20 includes a central gateway manager (CGM) 22, a power management module (PMM) 24, a source of electrical power 32, a wireless power transmitter 30, and a wireless power receiver 40 disposed external to the structure 22. An electrical load 42 may be electrically coupled to the wireless receiver 40.

In various embodiments and given by way of example only and not of limitation, the structure 20 may be any stationary or moving structure that includes a source of electrical power. The structure 20 may be a vehicle, a towable camper, a building, or the like.

In various embodiments the structure 20 includes a panel 34. The panel 34 may be any non-conductive material configured to allow an electromagnetic field to pass from one side to another side of the panel 34. The panel 34 may be made of glass, plexiglass, or the like.

In various embodiments and given by way of example only and not of limitation, wireless charging between the wireless power transmitter 30 and the wireless power receiver 40 may be performed by tightly-coupled electromagnetic induction, loosely-coupled radiative electromagnetic resonant charging, or the like. The wireless power transmitter 30 and the wireless power receiver 40 will be described in more detail below.

In various embodiments the panel 34 separates an interior of the structure 20 from an exterior of the structure 20. In various embodiments the wireless power transmitter 30 is operably couplable to the source of electrical power 32 and is configured to wirelessly transmit electrical power in the form of an electromagnetic field that changes relative to the wireless power receiver 40. The receiver 40 is alignable with the power transmitter 30 on an opposing side of the panel 34. The wireless power receiver 40 is configured to generate electrical power (that is, electrical current) responsive to the electrical power wirelessly transmitted (induced) via the electromagnetic field produced by the wireless power transmitter 30. The wireless power receiver be then be used to power an external accessory such as a projector or via an outlet embedded in the wireless power receiver.

In various embodiments the CGM 22 may receive a request for electrical power to be supplied by the power source 32 to the receiver 40 via the transmitter 30. The request for electrical power may be generated by various sources, such as, without limitation, a connection/alignment sensor, a user generated command, and the like. Responsive to the received request, the CGM 22 instructs the PMM 24 to instruct the power source 32 to supply electrical power to the transmitter 30.

Figure 2:
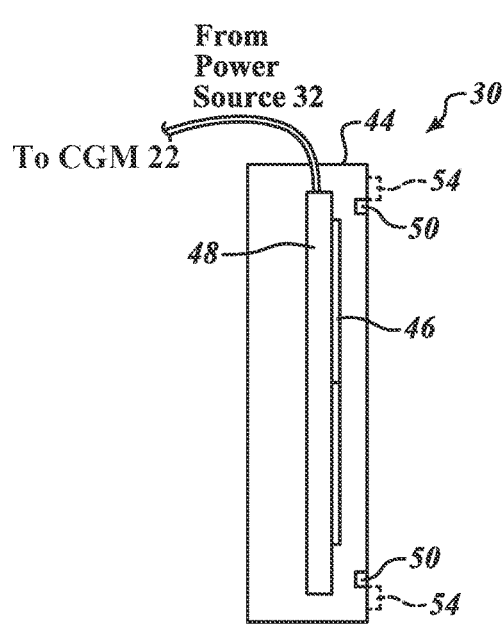
FIG. 2 is a side view of a power transmitter.
Figure 3:
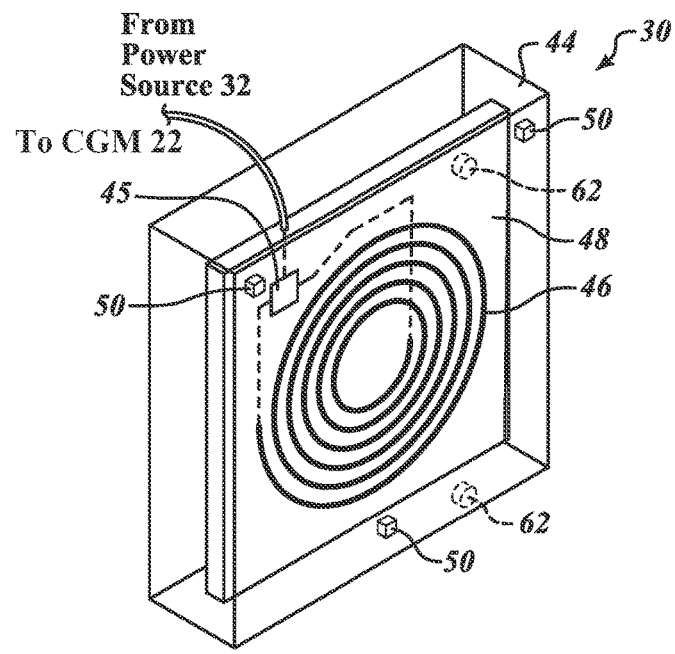
FIG. 3 is a perspective view of the power transmitter of FIG. 2.

Referring additionally to FIGS. 2 and 3, in various embodiments the wireless power transmitter 30 may include a housing 44, a circuit board 48, a transmission coil 46, electronics 45, and magnets 50. In various embodiments the transmission coil 46 and the electronics 45 are mounted to the circuit board 48.

In various embodiments, electrical traces on the circuit board 48 connect the transmission coil 46 to the electronics 45. An electrical connection is connected to the circuit board 48 for electrically connecting the electronics 45 to the source of electrical power 32. The source of electrical power 32 may be a source that produces a current, such as a generator, a battery, or the like.

In various embodiments the electronics 45 and/or the circuit board 48 may include circuit components configured to receive the current from the source of electrical power 32, convert the received current to a magnitude-varying current, such as an alternating current (AC), and sense when the receiver 40 is connected to or aligned with the transmitter 30. In such embodiments the received current may be a direct current (DC) and the electronics 45 may include components such as, without limitation, an oscillator or the like, for converting the DC to the magnitude varying current.

In other embodiments the source of electrical power 32 already produces AC electrical power. Thus, the electronics 45 may only regulate certain aspects of the AC electrical power, such as amplitude, frequency, or the like. Circuit components for applying magnitude-varying current or the like are well known in the art and no further explanation is necessary for a person of skill in the art to understand disclosed subject matter.

Figure 4:
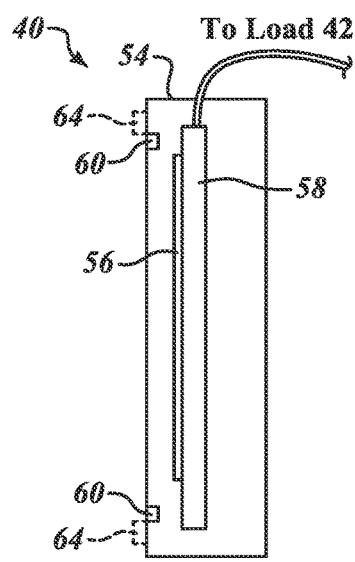
FIG. 4 is a side view of a power receiver.
Figure 5:
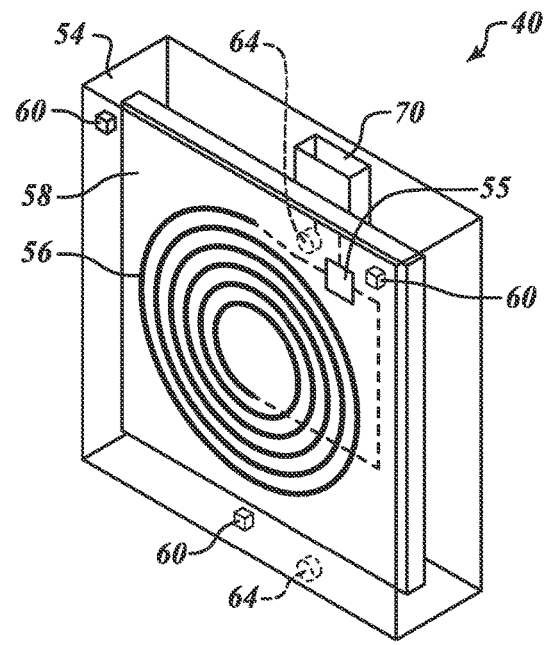
FIG. 5 is a perspective view of the power receiver of FIG. 4.
Figure 6:
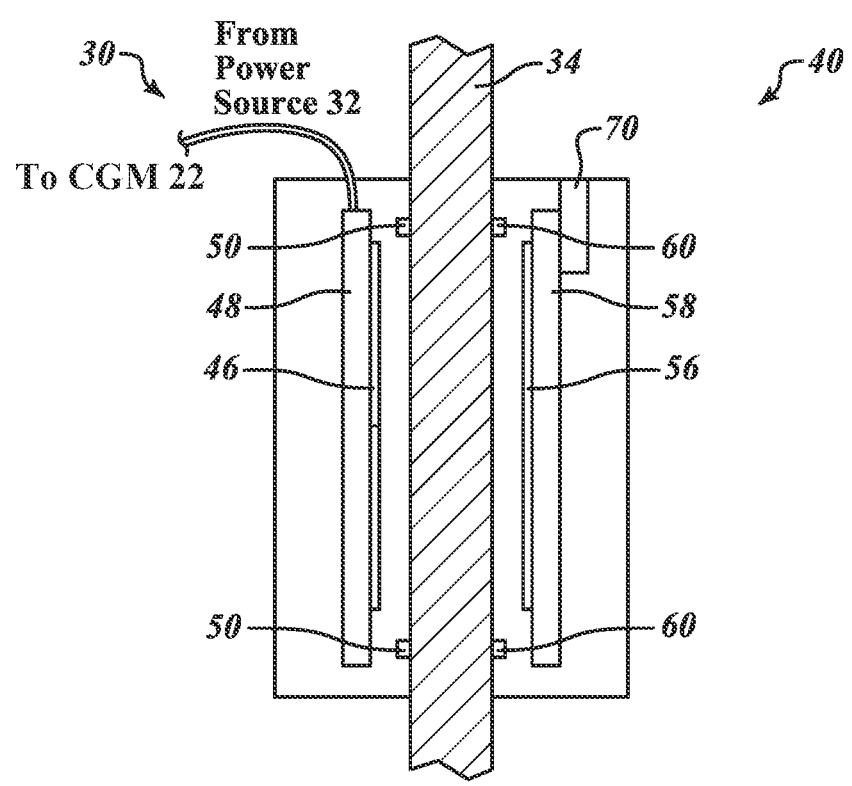
FIG. 6 is a side view of the power transmitter of FIG. 2 and the power receiver of FIG. 4 in a wireless power transmission operation.

Referring additionally to FIGS. 4 and 5, in various embodiments the wireless power receiver 40 may include a housing 54, a circuit board 58, a receiver coil 56, electronics 55, and magnets 60. The receiver coil 56 and the electronics 55 are mounted to the circuit board 58. Electrical traces on the circuit board 58 connect the receiver coil 56 to the electronics 55. An outlet port (power outlet) 70 is included in the housing 54. The outlet port 70 electrically connects to the electronics 55. A wire connected to the electrical load 42 may be received by the outlet port 70 for powering the electrical load 42.

An electromotive force (EMF) is induced in the receiver coil 56 responsive to a varying/changing magnetic field produced by magnitude varying current of the transmission coil 46. When the electrical load 42 is connected to the wireless power receiver 40, a circuit with the receiver coil 56 is closed, thereby allowing the EMF to induce an AC current. The electrical load 42 may be an AC or DC device. When the electrical load 42 is a DC device, such as, without limitation, LED lights, sound system, or the like, the electronics 55 include components configured to convert the induced AC current into a DC current, as desired. Circuit components for conversion of induced AC current or the like are well known in the art and no further explanation is necessary for a person of skill in the art to understand disclosed subject matter.

In various embodiments the wireless power transmitter 30 and/or the wireless power receiver 40 includes magnets 50 and 60 disposed within the transmitter housing 44 and/or the receiver housing 54. The magnets 50 of the transmitter housing 44 are configured to produce a magnetic force between opposing magnets 60 within the receiver housing 54. The magnets 50 and 60 may be ferromagnetic material instead of a magnet provided the opposing feature within the other housing is a magnet.

In various embodiments the housings 44 and/or 54 may include suction devices 62 and 64, respectively. The suction devices 62 and 64 may be coupled to the housings 44 and 54. The suction devices 62 and 64 are configured to provide an attaching force to the panel 34. The magnets 50 and 60 may also produce an attaching force of the housings 44 and 54 to the panel 34.

Figure 7:
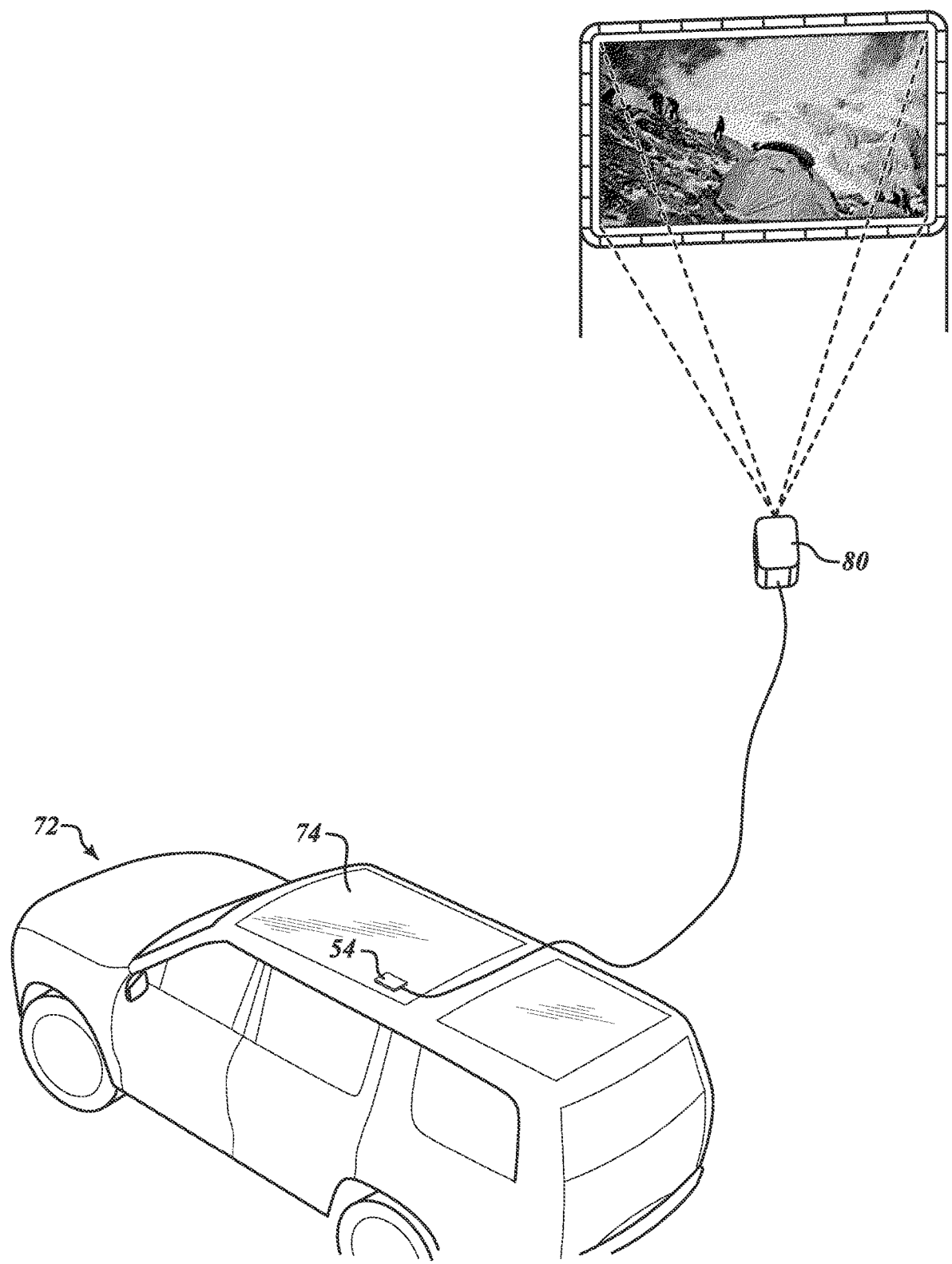
FIG. 7 is a schematic view of the components of FIG. 1 used with a vehicle.
Figure 8:
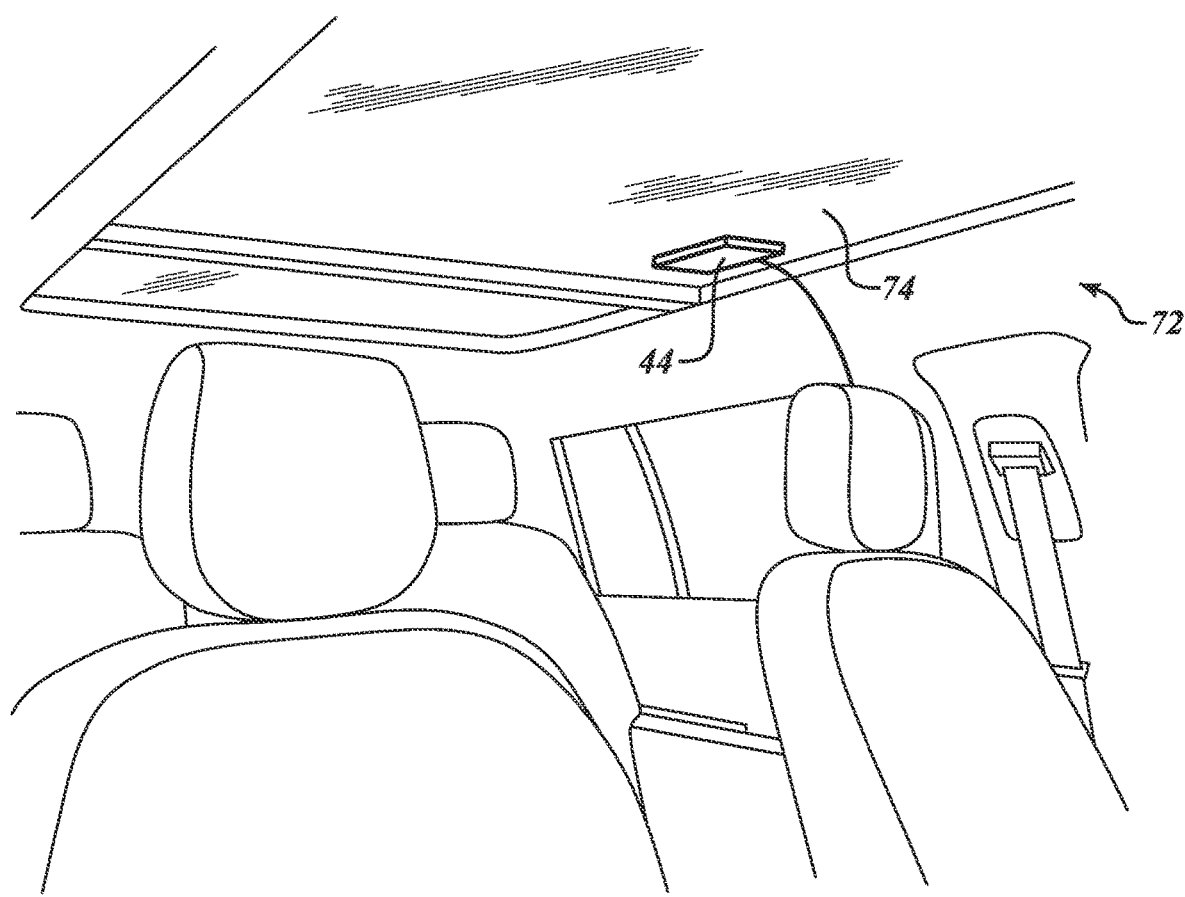
FIG. 8 is an interior view of the vehicle of FIG. 7.

Referring to FIGS. 7 and 8, a vehicle 72 includes a roof 74, such as without limitation a glass roof or the like. It will be appreciated that, as referred to herein, the vehicle 72 is a type of structure and the roof 74 is a type of panel. The transmitter housing 44 is attachable at an inside surface of the roof 74. A receiver housing 54 is attachable at an outside surface of the roof 74 opposite the transmitter housing 44. The receiver housing 54 connects to a projector 80. Other electrical loads may receive power from the receiver housing 54, such as, without limitations, lights, blenders, or the like.

In some instances, one or more components may be referred to herein as "configured to," "configured by," "configurable to," "operable/operative to," "adapted/adaptable," "able to," "conformable/conformed to," etc. Those skilled in the art will recognize that such terms (for example "configured to") generally encompass active-state components and/or inactive-state components and/or standby-state components, unless context requires otherwise.

While particular aspects of the present subject matter described herein have been shown and described, it will be apparent to those skilled in the art that, based upon the teachings herein, changes and modifications may be made without departing from the subject matter described herein and its broader aspects and, therefore, the appended claims are to encompass within their scope all such changes and modifications as are within the true spirit and scope of the subject matter described herein. It will be understood by those within the art that, in general, terms used herein, and especially in the appended claims (for example, bodies of the appended claims) are generally intended as "open" terms (for example, the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to claims containing only one such recitation, even when the same claim includes the introductory phrases "one or more" or "at least one" and indefinite articles such as "a" or "an" (for example, "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (for example, the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (for example, "a system having at least one of A, B, and C" would include but not be limited to systems that have A alone, B alone, C alone, A and B together, A and C together, B and C together, and/or A, B, and C together, etc.). It will be further understood by those within the art that typically a disjunctive word and/or phrase presenting two or more alternative terms, whether in the description, claims, or drawings, should be understood to contemplate the possibilities of including one of the terms, either of the terms, or both terms unless context dictates otherwise. For example, the phrase "A or B" will be typically understood to include the possibilities of "A" or "B" or "A and B."

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples can be implemented, individually and/or collectively, by a wide range of hardware, software (e.g., a high-level computer program serving as a hardware specification), firmware, or virtually any to patentable subject matter under 35 U.S.C. 101. In an embodiment, several portions of the subject matter described herein may be implemented via Application Specific Integrated Circuits (ASICs), Field Programmable Gate Arrays (FPGAs), digital signal processors (DSPs), or other integrated formats. However, those skilled in the art will recognize that some aspects of the embodiments disclosed herein, in whole or in part, can be equivalently implemented in integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, limited to patentable subject matter under 35 U.S.C. 101, and that designing the circuitry and/or writing the code for the software (e.g., a high-level computer program serving as a hardware specification) and or firmware would be well within the skill of one of skill in the art in light of this disclosure. In addition, those skilled in the art will appreciate that the mechanisms of the subject matter described herein are capable of being distributed as a program product in a variety of forms, and that an illustrative embodiment of the subject matter described herein applies regardless of the particular type of signal bearing medium used to actually carry out the distribution. Examples of a signal bearing medium include, but are not limited to, the following: a recordable type medium such as a floppy disk, a hard disk drive, a Compact Disc (CD), a Digital Video Disk (DVD), a digital tape, a computer memory, etc.; and a transmission type medium such as a digital and/or an analog communication medium (e.g., a fiber optic cable, a waveguide, a wired communications link, a wireless communication link (e.g., transmitter, receiver, transmission logic, reception logic, etc.), etc.).

With respect to the appended claims, those skilled in the art will appreciate that recited operations therein may generally be performed in any order. Also, although various operational flows are presented in a sequence(s), it should be understood that the various operations may be performed in other orders than those which are illustrated or may be performed concurrently. Examples of such alternate orderings may include overlapping, interleaved, interrupted, reordered, incremental, preparatory, supplemental, simultaneous, reverse, or other variant orderings, unless context dictates otherwise. Furthermore, terms like "responsive to," "related to," or other past-tense adjectives are generally not intended to exclude such variants, unless context dictates otherwise.

While the disclosed subject matter has been described in terms of illustrative embodiments, it will be understood by those skilled in the art that various modifications can be made thereto without departing from the scope of the claimed subject matter as set forth in the claims.

What is claimed is:

1. A system comprising:
    a power transmitter operably couplable to a source of electrical power and configured to wirelessly transmit electrical power, wherein the power transmitter comprises a transmission coil disposed in a power transmitter housing and a plurality of magnets coupled to the power transmitter housing adjacent to the transmission coil; and
    a power receiver alignable with the power transmitter on an opposing side of a panel of a structure and configured to generate electrical power responsive to the electrical power wirelessly transmitted by the power transmitter, wherein the power receiver comprises a receiver coil disposed in a power receiver housing and a plurality of magnets coupled to the power receiver housing adjacent to the receiver coil;
    wherein the power receiver is alignable with the power transmitter by attraction of the plurality of magnets coupled to the power receiver housing to the plurality of magnets coupled to the power transmitter housing through the panel.

2. The system of claim 1, further comprising a suction device couplable to at least one device chosen from the power transmitter and the power receiver and configured to provide an attaching force to the panel.

3. The system of claim 1, wherein the power receiver includes an electrical power outlet.

4. The system of claim 1, wherein the transmission coil is a first electrically conductive coil configured to:
   receive a magnitude varying current; and
   generate a changing electromagnetic field responsive to the received magnitude varying current.

5. The system of claim 4, wherein the receiver coil is a second electrically conductive coil configured to allow an electromotive force to be induced responsive to the changing electromagnetic field generated by the first electrically conductive coil.

6. A structure comprising:
   a source of electrical power;
   a panel configured to separate an interior of the structure from an exterior of the structure; and
   a system including:
      a power transmitter operably couplable to a source of electrical power and configured to wirelessly transmit electrical power, wherein the power transmitter comprises a transmission coil disposed in a power transmitter housing and a plurality of magnets coupled to the power transmitter housing adjacent to the transmission coil; and
      a power receiver alignable with the power transmitter on an opposing side of a panel of a structure and configured to generate electrical power responsive to the electrical power wirelessly transmitted by the power transmitter, wherein the power receiver comprises a receiver coil disposed in a power receiver housing and a plurality of magnets coupled to the power receiver housing adjacent to the receiver coil;
      wherein the power receiver is alignable with the power transmitter by attraction of the plurality of magnets coupled to the power receiver housing to the plurality of magnets coupled to the power transmitter housing through the panel.

7. The structure of claim 6, wherein the system further includes a suction device couplable to at least one device chosen from the power transmitter and the power receiver and configured to provide an attaching force to the panel.

8. The structure of claim 6, wherein the power receiver includes an electrical power outlet.

9. The structure of claim 6, wherein the transmission coil is a first electrically conductive coil configured to:
   receive a magnitude varying current; and
   generate a changing electromagnetic field responsive to the received magnitude varying current.

10. The structure of claim 9, wherein the receiver coil is a second electrically conductive coil configured to allow an electromotive force to be induced by the changing electromagnetic field generated by the first electrically conductive coil.

11. A method comprising:
   aligning a power receiver with a power transmitter on opposing sides of a panel of a structure, wherein the power receiver is aligned with the power transmitter by attraction of a plurality of magnets coupled to a power receiver housing adjacent to a receiver coil to a plurality of magnets coupled to a power transmitter housing adjacent to a transmission coil through the panel;
   operably coupling the power transmitter to a source of electrical power;
   wirelessly transmitting electrical power from the power transmitter to the power receiver; and
   generating electrical power by the power receiver responsive to the electrical power transmitted by the power transmitter.

12. The method of claim 11, further comprising magnetically coupling the power transmitter and the power receiver on opposing sides of a panel of a structure.

13. The method of claim 11, further comprising attaching at least one device chosen from the power transmitter and the power receiver to a panel of a structure using a suction device.

14. The method of claim 11, wherein wirelessly transmitting electrical power includes:
   receiving a magnitude varying current at the transmission coil comprising a first electrically conductive coil; and
   generating a changing electromagnetic field around the first electrically conductive coil responsive to the received magnitude varying current.

15. The method of claim 14, wherein generating electrical power further includes inducing an electromotive force at the receiver coil comprising a second electrically conductive coil responsive to the changing electromagnetic field.

\* \* \* \* \*